(12) United States Patent
van der Lelij

(10) Patent No.: US 11,259,464 B2
(45) Date of Patent: Mar. 1, 2022

(54) LOCKING LINKAGE FOR FOLDING AGRICULTURAL IMPLEMENT

(71) Applicant: CNH Industrial America LLC, New Holland, PA (US)

(72) Inventor: Bart van der Lelij, Abbenbroek (NL)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/212,607

(22) Filed: Mar. 25, 2021

(65) Prior Publication Data
US 2021/0298238 A1 Sep. 30, 2021

(30) Foreign Application Priority Data
Mar. 25, 2020 (EP) ..................................... 20165639

(51) Int. Cl.
*A01D 78/10* (2006.01)
*A01B 73/04* (2006.01)

(52) U.S. Cl.
CPC ........ *A01D 78/1014* (2013.01); *A01B 73/044* (2013.01)

(58) Field of Classification Search
CPC ............ A01D 78/1014; A01D 78/1007; A01D 78/1028; A01D 41/144; A01B 73/044; A01B 73/046; A01B 73/04
See application file for complete search history.

(56) References Cited

U.S. PATENT DOCUMENTS

| 3,797,580 A | 3/1974 | Roth |
| 3,948,327 A | 4/1976 | Parker et al. |
| 4,046,203 A * | 9/1977 | Ward ................... A01B 73/044 |
| | | 172/456 |

(Continued)

FOREIGN PATENT DOCUMENTS

| CA | 1197130 A | 11/1985 | |
| DE | 4005288 A1 * | 8/1991 | ........... A01B 73/042 |

(Continued)

OTHER PUBLICATIONS

Extended European Search Report for application EP20165639.4, dated Sep. 18, 2020 (7 pages).

*Primary Examiner* — Alicia Torres
*Assistant Examiner* — Madeline Ivy Runco
(74) *Attorney, Agent, or Firm* — Peter Zacharias; Patrick Sheldrake

(57) ABSTRACT

An agricultural implement includes a first frame member and a second frame member pivotally connected to each other and an actuating assembly configured to rotate the second frame member. The actuating assembly includes a first link pivotally connected to the first frame member, a second link pivotally connected to the second frame member, and a third link attached to an actuator. Two of the first, second, and third links are pivotally connected by a connecting pin, which is received in a slot formed in the third one of the links. The actuating assembly is configured to prevent the pin from moving along the slot and to allow rotation of the second link relative to the third link, when the second frame member is arranged between a retracted position and an expanded position, and to allow the pin to move along the slot, when the second frame member is arranged in the expanded position.

13 Claims, 3 Drawing Sheets

(56) References Cited

U.S. PATENT DOCUMENTS

| | | | | |
|---|---|---|---|---|
| 4,047,575 A * | 9/1977 | Wagner | A01B 73/044 | 172/311 |
| 4,050,523 A | 9/1977 | Poland | | |
| 4,074,766 A * | 2/1978 | Orthman | A01B 73/04 | 172/311 |
| 4,178,998 A * | 12/1979 | Rockwell | A01B 73/046 | 172/311 |
| 4,232,747 A * | 11/1980 | Pfenninger | A01B 73/044 | 172/311 |
| 4,328,869 A * | 5/1982 | Perelli | A01B 73/044 | 172/311 |
| 4,512,416 A | 4/1985 | Smith | | |
| 4,535,848 A * | 8/1985 | Pfenninger | A01B 73/04 | 172/311 |
| 4,862,758 A * | 9/1989 | Magee | A01B 73/044 | 74/103 |
| 4,878,545 A * | 11/1989 | Dyken | A01B 73/04 | 172/776 |
| 5,740,870 A * | 4/1998 | Rodgers | A01B 73/044 | 172/456 |
| 5,921,325 A * | 7/1999 | Meek | A01M 7/0075 | 172/311 |
| 7,438,137 B2 * | 10/2008 | Pederson | A01B 73/044 | 172/311 |
| 8,122,970 B2 * | 2/2012 | Palen | A01B 73/046 | 172/311 |
| 8,468,655 B2 * | 6/2013 | Borkgren | A01B 73/044 | 16/348 |
| 9,433,139 B2 * | 9/2016 | Stettner | A01B 73/044 | |
| 10,143,136 B2 * | 12/2018 | Sudhues | A01D 57/20 | |
| 2015/0163989 A1 * | 6/2015 | Landoll | A01B 73/044 | 172/311 |
| 2018/0049363 A1 | 2/2018 | Antoni et al. | | |
| 2020/0053951 A1 * | 2/2020 | Becker | F16C 11/04 | |

FOREIGN PATENT DOCUMENTS

| | | | | |
|---|---|---|---|---|
| DE | 20011429 U1 | 9/2000 | | |
| EP | 0443338 A1 | 8/1991 | | |
| EP | 1050205 A1 * | 11/2000 | | A01D 78/1014 |
| EP | 3000298 A1 | 3/2016 | | |
| EP | 3251490 A1 | 12/2017 | | |
| GB | 2092661 A | 8/1982 | | |
| WO | 2013057613 A1 | 4/2013 | | |

\* cited by examiner

LOCKING LINKAGE FOR FOLDING AGRICULTURAL IMPLEMENT

FIELD OF THE INVENTION

The present invention relates to an agricultural implement and a method for transferring an agricultural implement into a working condition.

In particular, the present invention relates to an agricultural implement having a central main frame and at least one foldable frame member pivotally arranged on one side of the main frame in a lateral direction of the implement, such as a tedder, a plow, a seeder or the like requiring the at least one foldable frame member to follow the ground surface while moving the implement across a field.

BACKGROUND OF THE INVENTION

To allow the implement to travel on a road, implements are transferred into a transport condition, in which their width in a lateral direction of the implement is small enough for road traffic and does not exceed a given limit. When arriving on the field, the implements are then transferred into a working condition, in which the at least one foldable frame member carrying at least one tool is arranged in an expanded position allowing the at least one tool to operate on the ground. While traveling across the field during operation, the at least one foldable frame member of the implement needs to follow the ground surface and, therefore, its pivotal connection must allow a certain vertical movement of the foldable frame member relative to the main frame. Suitable pivotal connections are for example disclosed in inter alia U.S. Pat. No. 4,050,523, US 2018/0049363 A1, WO 2013/057613 A1 or EP 0 443 338 B1.

To provide the foldable frame member with the required freedom to move in the vertical direction when in the working position, the pivotal connection must provide a certain degree of freedom. This, however, often results in the adverse effect of the foldable frame member tending to tip over from one side to the other when its center of gravity moves beyond the pivot axis in the lateral direction, thereby generating a shock on associated components of the implement every time the foldable frame member is folded in or folded out. Thus, additional means for absorbing said shock have to be provided or the pivotable hinge connection must be designed to avoid tipping over of the foldable frame member resulting in a more complex and expensive hinge assembly.

SUMMARY OF THE INVENTION

It is therefore an object of the present invention to provide an agricultural implement having at least one foldable frame member with improved durability, which allows for a simple and cost-efficient construction. It is a further object of the present invention to provide a method for smoothly and gently transferring an agricultural implement into a working condition.

These objects are solved by the subject-matter of independent claims 1 and 15. Preferred embodiments are subject of the dependent claims.

According to the invention, an agricultural implement comprises:

a first frame member and a second frame member, at least the second frame member carrying at least one implement tool, wherein the second frame member is pivotally connected to the first frame member by means of a hinge defining a first pivot axis;

a first actuating assembly configured to rotate the second frame member relative to the first frame member about the first pivot axis between a retracted position and an expanded position of the second frame member, the actuating assembly comprising:

an actuator providing an actuating force;

a first link having a first end pivotally connected to the first frame member and a second end opposite to the first end;

a second link having a first end pivotally connected to the second frame member and a second end opposite to the first end; and a third link having a first end attached to the actuator and a second end opposite to the first end wherein two of the first link, the second link and the third link are pivotally connected to each other at their second ends by means of a connecting pin defining a second pivot axis, and wherein the third one of the first link, the second link and the third link comprises an elongated slot is formed therein, wherein the connecting pin is movably received in said slot;

wherein the actuating assembly is configured to prevent the connecting pin from moving in a longitudinal direction of the slot and to allow rotation of the second link relative to the third link, when the second frame member is moved and arranged between the retracted position and the expanded position, and wherein the actuating assembly is configured to allow the connecting pin to move in the longitudinal direction of the slot, when the second frame member is arranged in the expanded position.

In this manner, an implement is provided, which allows the foldable second frame member to move relative to the first frame member in the working position, in which the connecting pin is able to move along the slot, and which prevents the second frame member from tipping over during expansion by blocking the pin from moving along the slot. Thus, shocks on the implement's components are prevented and the loads acting on the components are reduced. Furthermore, the actuating assembly comprises only a small number of simple components resulting in a simple and cost-efficient design of the pivotal connection between the first and second frame members.

In a preferred embodiment, the second end of the first link and the second end of the second link are pivotally connected to each other by means of the connecting pin and the third link comprises the elongated slot.

Preferably, the first link is directly connected to the first frame member and the second link is directly connected to the second frame member to further simplify the design of the actuating assembly. The third link may be directly and fixedly attached to the actuator. For example, the third link is fixedly attached to a piston rod of a cylinder. Being "directly" connected or attached to an element shall define a connection only comprising connecting means, such as a bolt, but not comprising further elements, such as an additional link member, between the elements directly connected to each other. Therefore, the actuating assembly preferably consists of the actuator, the first link, the second link and the third link as well as suitable connecting means providing the respective pivotal connection.

In the retracted position of the second frame member, the second frame member is preferably folded over the first frame member to decrease a width of the implement in a lateral direction of the implement and the first actuating assembly is configured to lock the second frame member relative to the first frame member. The second frame member is, therefore, securely held in the retracted position, thereby decreasing the lateral extension of the implement. The lateral direction of the implement extends transverse to a travel direction of the implement and substantially parallel to the ground.

Locking the second frame member relative to the first frame member can be achieved by retracting the actuator and the third link such that the connecting pin contacts an end surface of the slot at a second end side of the respective link. Hence, the second link and the second frame member cannot move any further in the lateral direction towards the expanded position.

In the expanded position, the second frame member is preferably arranged next to the first frame member in the lateral direction of the implement thereby enabling operation of the at least one implement tool, and the first actuating assembly is configured to allow vertical movement of the second frame member relative to the first frame member to a certain extent. During vertical movement of the second frame member, the second frame member rotates with respect to to the first frame member and the connecting pin moves within the slot in a longitudinal direction thereof. Of course, the hinge connecting the first and second frame members must allow the rotational movement of the second frame member as well.

For example, the second frame member is rotated about the first pivot axis between the retracted position (FIG. 1) and the expanded position (FIG. 5) by an angle lying in a range between 160° and 200°, preferably between 170° and 190° and more preferably between 175° and 185°.

Preferably, the first actuating assembly is configured to be in positive control of the second frame member while moving the second frame member between the retracted position and the expanded position and vice versa. That is, the second frame member does not have any freedom to move independently, in particular, in an intermediate range of motion in which the center of gravity of the second frame member moves beyond the first pivot axis in the lateral direction. Rather, between the retracted position and the expanded position, the second frame member is constantly guided and held by the actuating assembly and is therefore not freely movable with respect to the first frame member. Tipping over of the second frame member can therefore be avoided reliably in both directions of movement.

According to a preferred embodiment, one of the first link, the second link and the third link comprises stop means configured to block translatory motion of the one of the first link, the second link and the third link comprising the slot relative to the connecting pin thereby preventing the connecting pin from moving in a longitudinal direction of the slot, while the second frame member is arranged between the retracted position and the expanded position. Rotation of the first link, the second link and the third link relatively to each other, however, is allowed. In general, a position between the retracted position and the expanded position shall not include the expanded position.

Furthermore, the at least one of the first link, the second link and the third link comprising said stop means is configured to release the one of the first link, the second link and the third link comprising the slot in the expanded position, thereby allowing translatory motion of the connecting pin relative to the slot in the longitudinal direction of the slot. The second frame member can then move relative to the first frame member in order to enable the tools of the implement to follow the ground surface.

According to a particularly preferred embodiment, the stop means is a shoulder formed on one of the second link and the third link, wherein the shoulder defines a first guide surface and the other one of the second link and the third link comprises a second guide surface matching the first guide surface. The first and second guide surfaces are formed to allow rotation of the second link relative to the third link and to block translatory motion of the connecting pin relative to the slot in the longitudinal direction of the slot, while the second frame member is moved and arranged between the retracted position and the expanded position. The first and second guide surfaces are further formed to allow translatory motion of the connecting pin in the longitudinal direction of the slot, when the second frame member is arranged in the expanded position.

For example, the shoulder defines a concave first guide surface and the other one of the second link and the third link defines a convex second guide surface, the radius of which corresponds to the radius of the first guide surface. The first and second guide surfaces are engaged while the second frame member is arranged and moved between the retracted position and the expanded position. The first and second guide surfaces and thus the second and third links are prevented from translatory motion with respect to each other but allowed to rotate with respect to each other by means of their engagement. Approaching the expanded position, however, the first and second guide surfaces are disengaged to allow translatory motion of the connecting pin relative to the slot. For example, one of the first and second guide surfaces releases the other guide surface from engagement as the second frame member arrives in the expanded position.

In one embodiment, the second link comprises the shoulder defining a concave first guide surface between its first and the second ends and the third link comprises a second end opposite to its first end, an outer surface of the third link's second end defining a convex second guide surface.

In order to provide a more efficient implement having a balanced structure, the implement may further comprise:
a main frame;
a third frame member corresponding to the first frame member;
a fourth frame member corresponding to the second frame member and pivotally connected to the third frame member by means of a hinge defining a third pivot axis; and
a second actuating assembly corresponding to the first actuating assembly and configured to rotate the fourth frame member relative to the third frame member about the third pivot axis between a retracted position and an expanded position of the fourth frame member;
wherein the first and third frame members are arranged on opposite sides of the main frame in the lateral direction of the implement.

It is noted that all features and beneficial embodiments described above with respect to the first frame member, the second frame member and the first actuating assembly are applicable to the third frame member, the fourth frame member and the second actuating assembly, respectively, in an analogous manner. The implement then preferably comprises at least a first and a second wing-like frame assembly symmetrically arranged with respect to the main frame. The first wing-like frame assembly comprises the first and second frame members and the second wing-like frame assembly comprises the third and fourth frame members.

The first and third frame members may be directly connected to the main frame. In certain embodiments, however, additional frame members may be provided between the main frame and the first frame member and, if applicable, between the main frame and the third frame member. Such additional frame members are pivotally connected to the main frame and may be rigidly connected to the first frame member and the third frame member, respectively, or may be pivotally connected to the first frame member and the third frame member, respectively.

Preferably, the main frame is provided with connecting means capable of connecting the implements to a towing vehicle. Said connecting means may comprise means for connecting the implement to a three-point hinge of a tractor and/or means for connecting the implement to the PTO of a tractor.

To provide an even simpler structure, the first link, the second link, and the third link may each be formed by an elongated member, the elongated member defining a longitudinal direction and comprising a hole in its first and second ends. The holes formed in the elongated member are provided to receive a bolt thereby forming a pivotable connection. The elongated member may have a substantially flat, plate-like shape. In the one of the first link, the second link, and the third link comprising the slot, said hole is preferably formed integrally with the slot.

The second link may comprise a first section extending from its first end towards an end surface defining the shoulder, and a second section adjacent to the first section and extending from the first section towards the second end of the second link. The first and second sections may be separate parts connected to each other or may be integrally formed as a single part. The first section of the second link is preferably arranged in one plane with the third link.

It is preferred that the first and second links are arranged on opposite sides of the third link in an axial direction of the connecting pin to symmetrically induce any forces provided by the actuator via the third link.

Preferably, the elongated slot is a through hole and the connecting pin extends through the first link, the second link, and the third link as well as through the slot to properly support the connecting pin. The connecting pin may also be integrally formed with the first or second link.

In a preferred embodiment the actuator of the first actuating assembly and, if applicable, of the actuator of the second actuating assembly as well, is a double acting hydraulic or pneumatic cylinder, wherein a piston rod of said cylinder is connected to the first end of the third link.

Each frame member may further be provided with at least one ground engaging wheel for supporting the respective frame member on the ground. A height of each frame member over the ground may be varied by adjusting the position of the wheels relative to the respective frame member. A working depth of the implement tools carried by the frame members can thereby be adapted as required.

The present invention also relates to a combination of an agricultural vehicle and an implement towed by said agricultural vehicle, the implement corresponding to an implement according to the invention as described above. Preferably, the agricultural vehicle is a tractor.

The present invention further relates to a method for transferring an agricultural implement according to the present invention into a working condition, in which the second frame member is arranged in the expanded position relative to the first frame member, the method comprising the steps of:

operating the actuator, thereby moving the third link in a substantially lateral direction of the implement causing the second frame member to rotate about the first pivot axis;

preventing, by means of the first actuating assembly, the one of the first link, the second link and the third link comprising the slot from translatory motion relative to the connecting pin while the second frame member rotates about the first pivot axis between the retracted position and the expanded position;

releasing the one of the first link, the second link and the third link comprising the slot, thereby enabling translatory motion of the third link with respect to the connecting pin, when the second frame member is arranged in the expanded position.

Preferably, the third link is prevented from translatory motion by means of the second and third links and the third link is released by the second link.

It is noted that all other movements and actions described herein may also be considered as steps of the method according to the present invention.

BRIEF DESCRIPTION OF THE DRAWINGS

Further features and beneficial effects of the present invention will be apparent from the following specification under reference to the accompanying drawings.

DETAILED DESCRIPTION OF THE INVENTION

Figure 1:
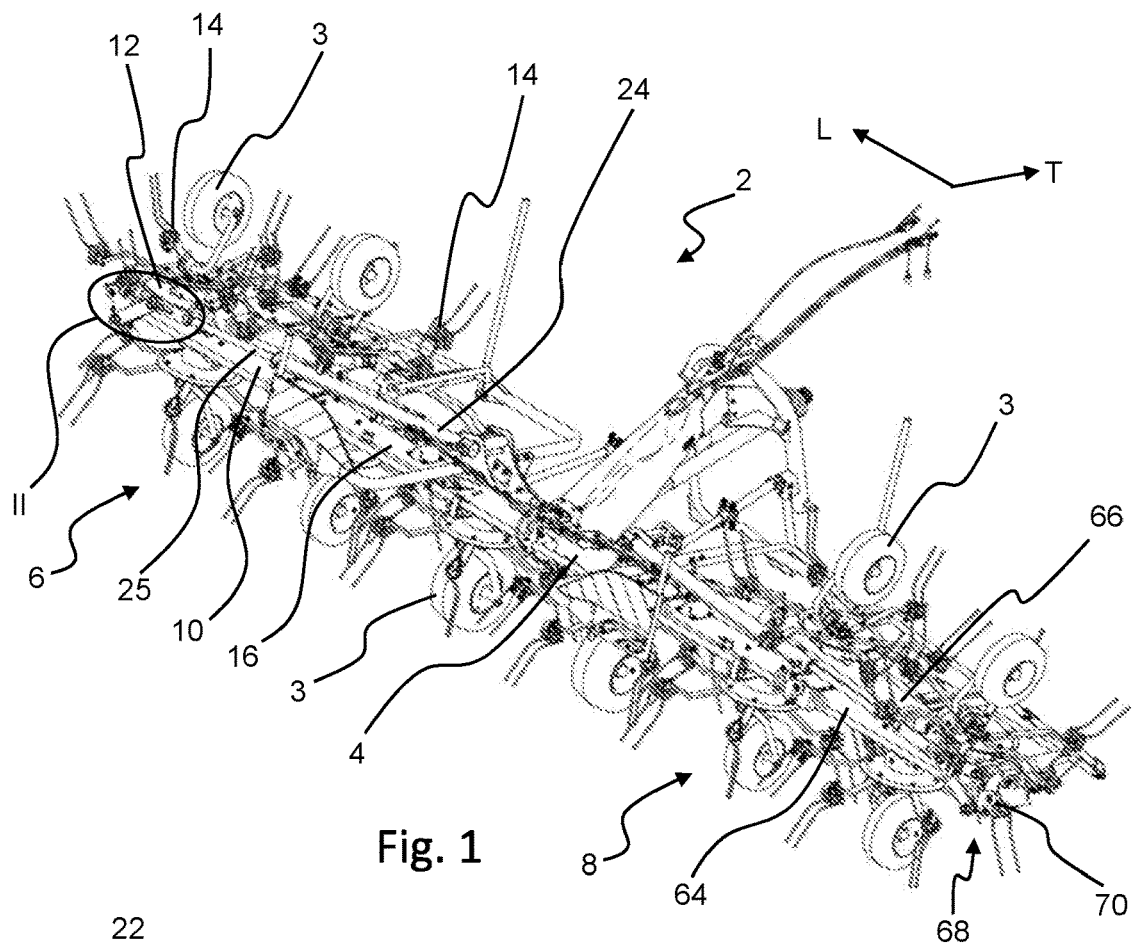
FIG. 1 is a perspective view of an implement according to the present invention with a foldable frame member in a retracted position.
Figure 2:
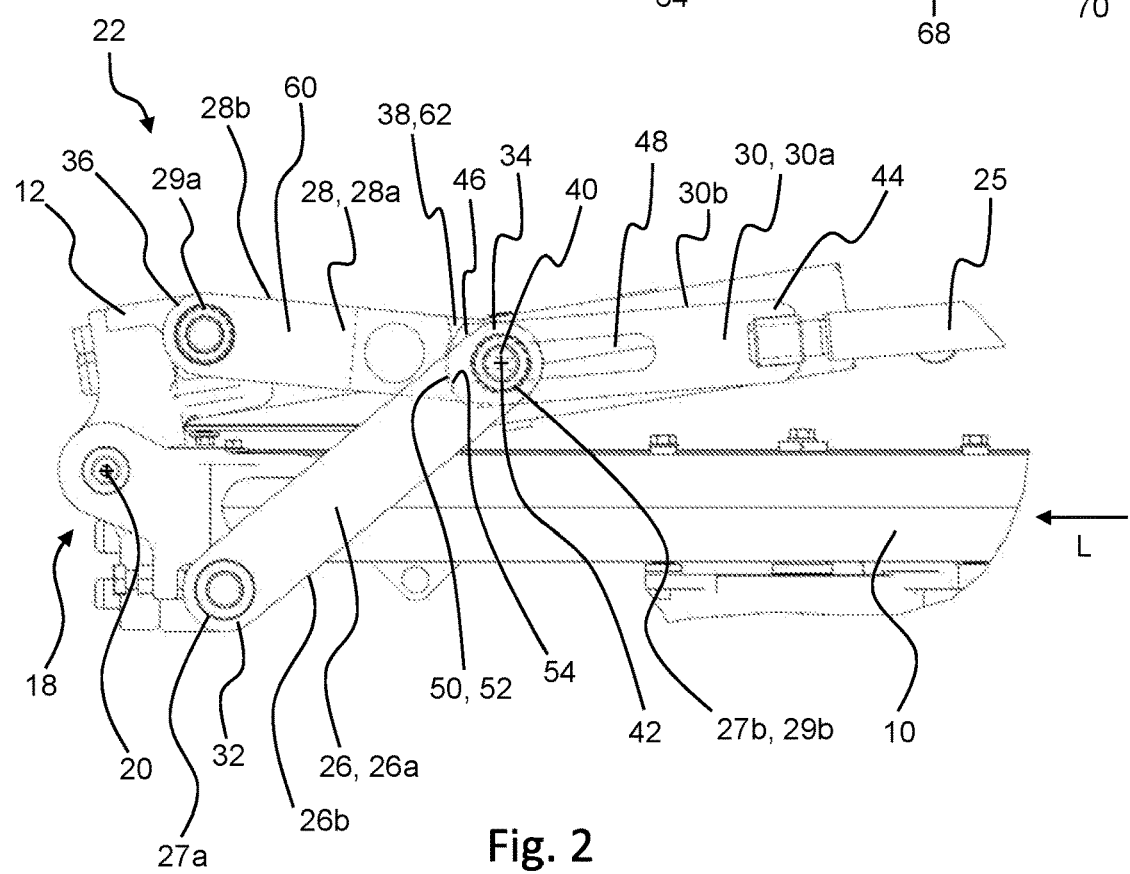
FIG. 2 is a detailed view of an actuating assembly of the implement indicated by section II in FIG. 1.
Figure 3:
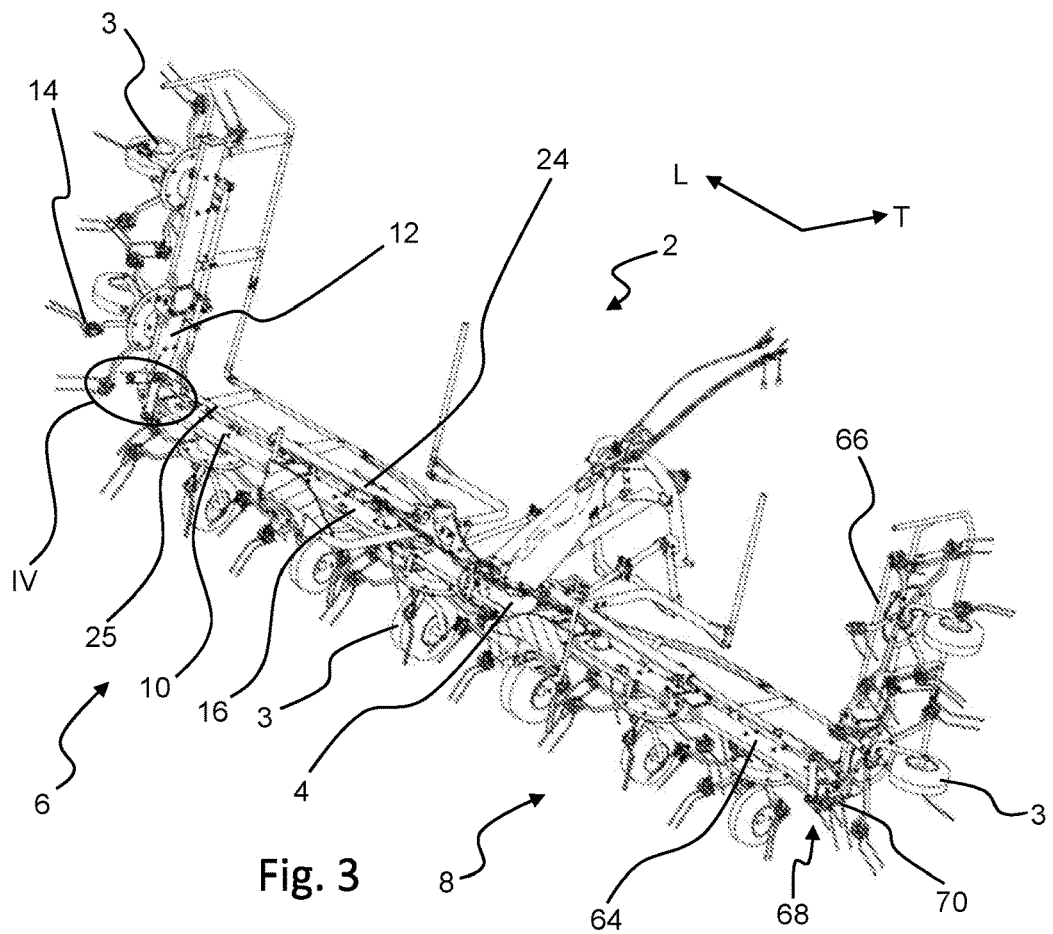
FIG. 3 is a perspective view of the implement shown in FIG. 1 with the foldable frame member in an intermediate position between the retracted position and an expanded position.
Figure 4:
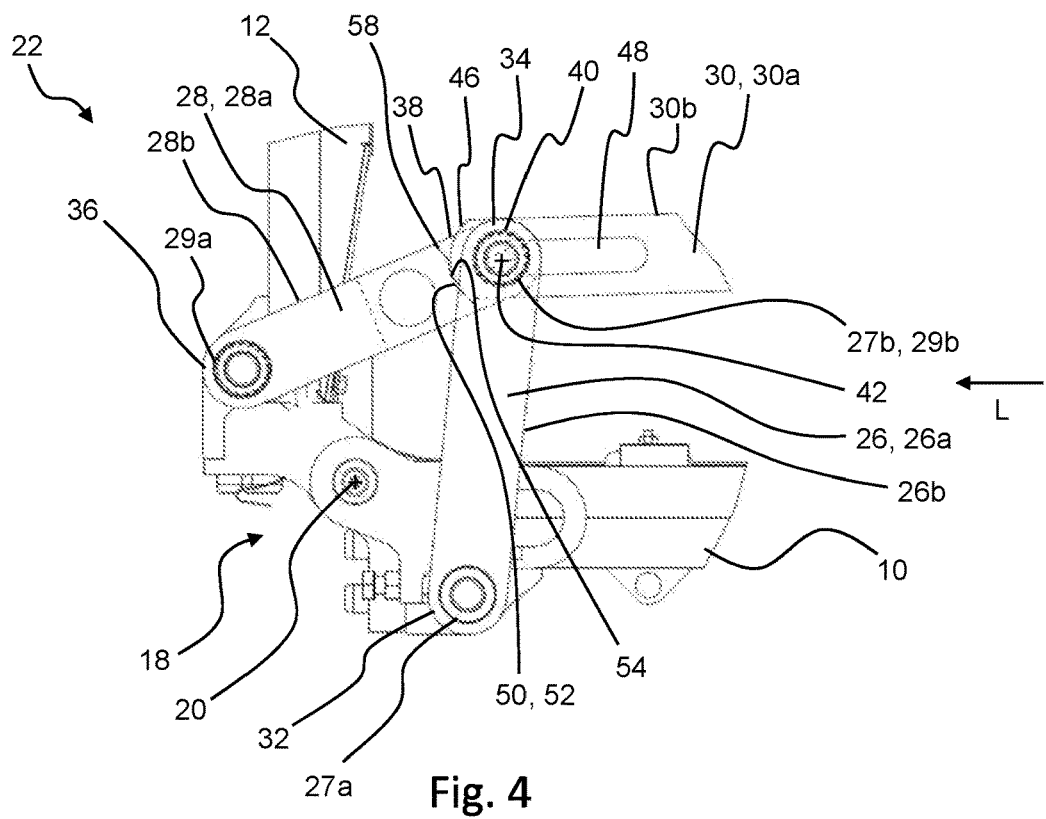
FIG. 4 is a detailed view of the actuating assembly of the implement indicated by section IV in FIG. 3.
Figure 5:
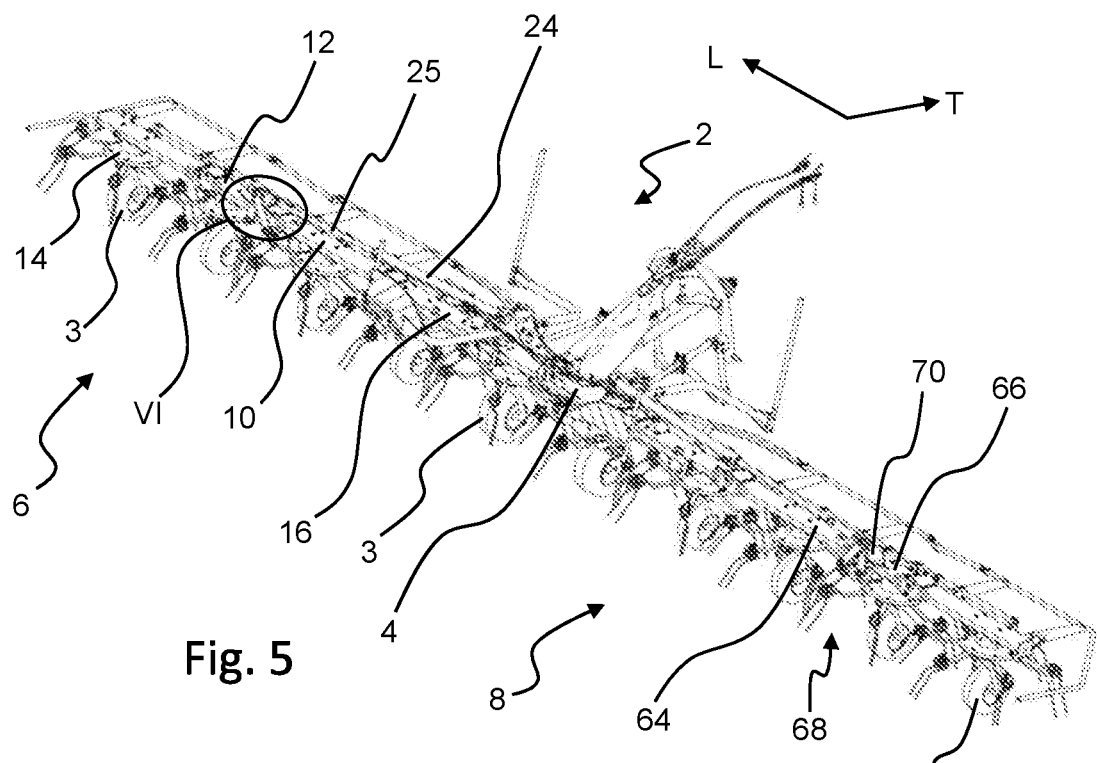
FIG. 5 is a perspective view of the implement shown in FIG. 1 with the foldable frame member in the expanded position.

In FIGS. 1, 3 and 5 and agricultural implement 2 according to the invention is shown in different conditions. In the embodiment shown in FIGS. 1 to 6, the implement 2 is a tedder having multiple ground engaging wheels 3 to support the implement 2 on the ground and multiple rotors forming implement tools 14. It will be apparent from the description of the implement 2 below, however, that the invention is not limited to a tedder but may be applied to any agricultural implement 2 having foldable frame members.

The implement 2 comprises a central main frame 4 towable by an agricultural vehicle, such as a tractor. The implement 2 is movable in a travel direction indicated by arrow T in FIG. 1. The implement 2 further comprises wing-like frame assemblies 6, 8 pivotally connected to opposite sides of the main frame 4 in a lateral direction L of the implement 2, the lateral direction L extending transverse to the travel direction T. The wing-like frame assemblies 6, 8 can be rotated with respect to the main frame 4 in order to transfer the implement 2 between a transport condition and a working condition.

In the transport condition (not shown), the width of the implement 2 in the lateral direction is limited to a maximum width allowable for road traffic. Therefore, the wing-like frame assemblies 6, 8 are folded to extend in a substantially vertical direction perpendicular to the travel direction T and the lateral direction L.

In the working condition shown in FIG. 5, it is usually desired to increase the width of the implement 2 and thus the efficiency of the implement. Therefore, the wing-like frame assemblies 6, 8 are unfolded to extend in a substantially horizontal direction parallel to the lateral direction L.

To transfer the implement 2 from the transport condition (not shown) into the working condition (FIG. 5), the wing-like frame assemblies 6, 8 are in a first step rotated as a whole into the condition shown in FIG. 1, in which the wing-like frame assemblies 6, 8 and their respective frame members are arranged horizontally. The wing-like frame assemblies 6, 8, however, are still partially folded and not yet fully expanded.

The implement 2, and in particular frame assembly 6, comprises a first frame member 10 and a second frame member 12 carrying at least one tool 14, such as a tedder rotor. The first frame member 10 may either be pivotally attached to the main frame 4 itself or may be rigidly attached to at least one additional frame member 16, which in turn is pivotally attached to the main frame 4. The second frame member 12 is pivotally connected to the first frame member 10 by means of a hinge 18 defining a first pivot axis 20.

In the condition shown in FIG. 1, the second frame member 12 is arranged in a retracted position, in which the second frame member 12 is folded over the first frame member 10 to decrease the width of the implement 2 in the lateral direction L of the implement 2.

The implement 2 further comprises a first actuating assembly 22 configured to rotate the second frame member 12 relative to the first frame member 10 about the first pivot axis 20 between the retracted position and an expanded position of the second frame member 12 as shown in FIG. 5. The first actuating assembly 22 is configured to be in positive control of the second frame member 12 while moving the second frame member 12 between the retracted position and the expanded position and vice versa.

Figure 6:
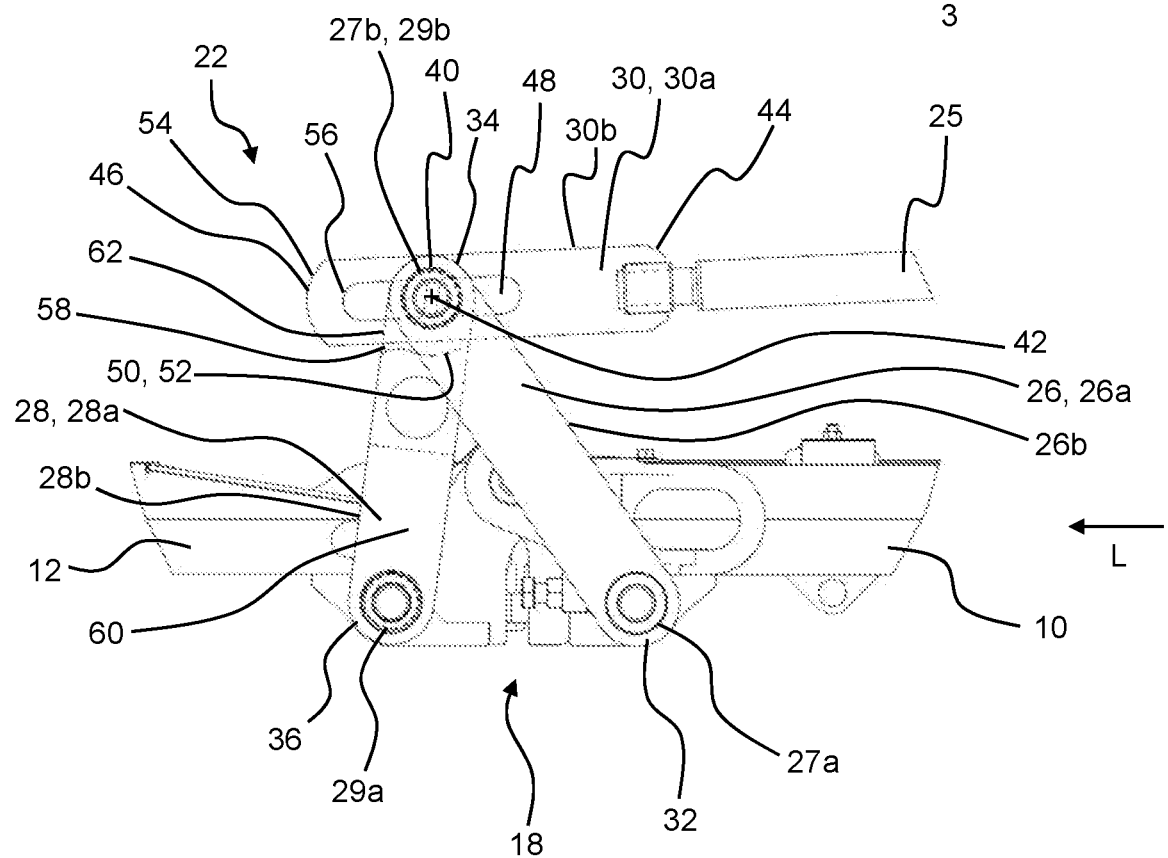
FIG. 6 is a detailed view of the actuating assembly of the implement indicated by section VI in FIG. 5.

The first actuating assembly 22 is shown in greater detail in FIGS. 2, 4 and 6. The first actuating assembly 22 comprises an actuator 24 (see FIGS. 1, 3, 5), such as a hydraulic cylinder, providing an actuating force, a first link 26, a second link 28 and a third link 30. Preferably, no further link members have to be provided. The first link 26 has a first end 32 pivotally connected to the first frame member 10 and a second end 34 opposite to the first end 32. The second link 28 has a first end 36 pivotally connected to the second frame member 12 and a second end 38 opposite to the first end 36. The second end 34 of the first link 26 and the second end 38 of the second link 28 are pivotally connected to each other by means of a connecting pin 40 defining a second pivot axis 42. The third link 30 has a first end 44 attached to the actuator 24, e.g. to a piston rod 25 of the cylinder, and a second end 46 opposite to the first end 44. An elongated slot 48 is formed in the third link 30 and the connecting pin 40 is movably received in said slot 48. That is, the connecting pin 40 is received in said slot 48 such that it is rotatable relative to the third link 30 and to be movable in longitudinal direction of the slot 48.

The first actuating assembly 22 is configured to prevent the connecting pin 40 from moving in the longitudinal direction of the slot 48 in order to reduce the second frame member's freedom to move and to be in positive control of the second frame member 12 until it is arranged in the expanded position. The first actuating assembly 22, however, allows rotation of the second link 28 relative to the third link 30 to enable the second frame member 12 to be moved in the expanded position. For this reason, at least one of the first, second and third link 26, 28, 30 comprises stop means 50 configured to block translatory motion of the third link 30 relative to the connecting pin 40, thereby preventing the connecting pin 40 from moving in the longitudinal direction of the slot 48, while the second frame member 12 is arranged between the retracted position and the expanded position.

In the embodiment shown, the stop means 50 is a shoulder formed on the second link 28 and defining a first guide surface 52. An outer surface of the second end 46 of the third link 30 defines a second guide surface 54 matching the first guide surface 52. The first and second guide surfaces 52, 54 are formed to allow rotation of the second link 28 relative to the third link 30 and to block translatory motion of the third link 30 relative to the connecting pin 40, while the second frame member 12 is arranged between the retracted position and the expanded position.

As can be seen in FIGS. 2, 4 and 6, the first guide surface 52 is a concave surface and the second guide surface 54 is a convex surface engaging the first guide surface 52. In this manner, rotation of the second and third link 28, 30 with respect to each other is allowed to a certain extent but translatory motion in the lateral direction L is prevented until the second frame member 12 reaches its expanded position.

The shoulder 50 may be integrally formed with or attached to one of the side surfaces 28a of the second link 28 facing the third link 30. The second link 28 may therefore comprise a first section 60 extending between the first end 36 and the shoulder 50 in a plane of the third link 30 and a second section 62 extending between the shoulder 50 and the second end 38 laterally offset to the plane of the third link 30.

In a preferred embodiment, the first, second and third links 26, 28, 30 are each formed by an elongated member having a substantially flat, plate-like shape. Each of the links 26, 28, 30 has opposing first and a second side surfaces 26a, 28a, 30a and a surrounding peripheral surface 26b, 28b, 30b, as shown in FIGS. 2, 4 and 6. The first link 26 and second link 28 may each comprise a hole 27a, 29a at their first end 32, 36 and a hole 27b, 29b at their second end 34, 38. The holes 27a, 29a formed on the first ends 32, 36 of the first and second links 26, 28 preferably receive a pin or bolt pivotally connecting the first ends 32, 36 to the first and second frame members 10, 12, respectively. The holes 27b, 29b formed on the second ends 34, 38 receive the connecting pin 40 pivotally connecting the second ends 34, 38 to each other. The elongated slot 48 is a through hole to allow the connecting pin 40 to extend through the first link 26, the slot 48, and the second link 28.

To avoid interference of the first and second links 26, 28 during rotation, the first and second links 26, 28 are preferably arranged on opposite sides of the third link 30 in an axial direction of the connecting pin 40. That is, the first link 26 may be arranged to face one of the first and second side surfaces 30a of the third link 30 and the second link 28 may be arranged to face the other of the first and second side surfaces 30a of the third link 30.

The procedure of transferring the implement 2 into the working condition and in particular of transferring the second frame member 12 from the retracted position into the expanded position will now be described.

In the retracted position shown in FIGS. 1 and 2, the first actuating assembly 22 is configured to lock the second frame member 12 relative to the first frame member 10, thereby preventing the connecting pin 40 from moving in the longitudinal direction of the slot 48. For example, retracting the actuator 24 towards the main frame 4 results in the connecting pin 40 abutting an end surface 56 (see FIG. 6) of the slot 48 located on a side of the second end 46 of the third link 30. Hence, the second frame member 12 is held in the retracted position without being able to rotate about the first pivot axis 20 towards its expanded position.

To initiate expansion of the second frame member 12, the actuator 24 is operated. The actuator 24 applies an actuating force to the third link 30 in the lateral direction, e.g. by expanding the actuator 24, in order to rotate the second frame member 12 relative to the first frame member 10 around the first pivot axis 20. As can be seen in FIG. 2, the second guide surface 54 of the third link 30 engages the first guide surface 52 of the second link 28. The second guide surface 54 is pressed against the first guide surface 52 when the actuator 24 is expanded in the lateral direction L. Translatory motion of the third link 30 relative to the second link 28 is thereby prohibited but the second frame member 12 is urged to rotate about the first pivot axis 20 towards an intermediate position as shown in FIGS. 3 and 4. While rotating, the first and second guide surfaces 52, 54 remain in contact.

In the intermediate position shown in FIGS. 3 and 4 the center of gravity of the second frame member 12 is about to move beyond the first pivot axis 20 in the lateral direction L. This results in a critical situation in which the second frame member 12 tends to tip over and cause a shock on the components of the actuating assembly 22 and the implement 2. However, the implement 2 according to the present invention maintains positive control of the second frame member 12 also in this critical situation. As can be seen in FIG. 4, the connecting pin 40 is still in contact with the end surface 56 of the slot 48 thereby holding back the second frame member 12 via the second link 28. The second frame member 12 has, therefore, no freedom to move further towards the lateral direction by itself. The first and second guide surfaces 52, 54 are, however, still engaged to allow the actuator 24 to apply the actuating force and to move the second frame member 12 towards the expanded position in a controllable manner.

In FIGS. 5 and 6, the implement 2 is shown in a working condition with the second frame member 12 arranged in the expanded position, in which the second frame member 12 is located next to the first frame member 10 in the lateral direction L of the implement 2, thereby enabling operation of the at least one tool 14 on the ground. In the expanded position, the first actuating assembly 22 is configured to allow the connecting pin 42 to move in the longitudinal direction of the slot 48 enabling vertical movement of the second frame member 12 relative to the first frame member 10 about the first pivot axis 20.

To do so, the first and second guide surfaces 52, 54 are formed to allow translatory motion of the third link 30 relative to the connecting pin 40, when the second frame member 12 is arranged in the expanded position. The second frame member 12 may then freely rotate about the first pivot axis 20 to follow the ground. As shown in FIG. 6, the first guide surface 52 may therefore be limited to an extent that allows the first and second guide surfaces 52, 54 to be engaged between the retracted and the expanded positions of the second frame member 12 but releases the second guide surface 54 and thus the third link 30 from the first guide surface 52 in the expanded position. In the expanded position, the second guide surface 54 and third link 30 are free to move in the lateral direction L and are not stopped by the first stop surface 52 and the second link 28, respectively. The range of motion of the connecting pin 40 is then limited by the length of the slot 48.

One way of adapting the range of motion and the point of release of the third link 30 relative to the second link 28 is to provide a bevel 58 on at least one side of the first guide surface 52. The bevel 58 decrease the extent of the first guide surface to a desired dimension, i.e. opens the first guide surface 52 towards an intended moving direction of the third link 30 to allow disengagement of the first and second guide surfaces 52, 54 in a predetermined position of the second frame member.

It is apparent, however, that the person skilled in the art is capable of adapting the actuating assembly 22 as desired, e.g. by adapting the radius of curvature of the first and second guide surfaces 52, 54, the range of engagement between said guide surfaces 52, 54 as well as their position with respect to the connecting pin 40 and the position and support of the first, second and third links 26, 28 and 30.

To transfer the implement 2 from the working condition shown in FIG. 5 back towards the transport condition (not shown) and, thus, the second frame member 12 from its expanded position shown in FIG. 5 into the retracted position shown in FIG. 1 via the intermediate position shown in FIG. 3, the actuator 24 is retracted. The second frame member 12 is thus rotated around the first pivot axis 20 by means of the second and third links 28, 30. Again, a critical point is reached when the center of gravity of the second frame member 12 moves beyond the first pivot axis 20 in the lateral direction L. The second frame member 12 is now prevented from tipping over by the stop means 50, in particular by the first and second guide surfaces 52, 54 with the first guide surface 52 being pushed against the second guide surface 54 of the third link 30 held by the actuator 24 (cf. FIG. 4). By subsequently retracting the actuator 24, the second frame member 12 is guided into the retracted position while the first actuating assembly 22 maintains positive control of the second frame member 12.

The wing-like frame assembly 8 of the implement 2 corresponds to the wing-like frame assembly 6 symmetrically arranged on the opposite side of the main frame 4 in the lateral direction L. In particular, the implement 2 and wing-like frame assembly 8 comprise a third frame member 64 corresponding to the first frame member 10, a fourth frame member 66 corresponding to the second frame member 12, and a second actuating assembly 68 corresponding to the first actuating assembly 22. The fourth frame member 66 is pivotally connected to the third frame member 64 by means of a hinge 70 defining a third pivot axis parallel to the first pivot axis 20. The second actuating assembly 68 is configured to rotate the fourth frame member 66 relative to the third frame member 64 about the third pivot axis between a retracted position and an expanded position of the fourth frame member 66. All features and effects described with reference to the wing-like frame assembly 6 and in particular to the first frame member 10, the second frame member 12 and the first actuating assembly 22 are applicable to the wing-like frame assembly 8, the third and fourth frame members 64, 66 and the second actuating assembly 68 in an analogue manner and a detailed description is thus omitted.

Further embodiments of the invention are derivable from the above description and accompanying drawings by the person skilled in the art. In particular, the person skilled in art is capable of adapting the actuating assembly as needed, e.g. by providing any other of the first, second and third links with the elongated slot and/or by providing the first and second guide surfaces on another pair of links out of the first, the second and the third links.

The invention claimed is:

1. An agricultural implement comprising:
a hinge defining a first pivot axis;
a first frame member and a second frame member, at least the second frame member carrying at least one implement tool, wherein the second frame member is pivotally connected to the first frame member by the hinge;
a first actuating assembly configured to rotate the second frame member relative to the first frame member about the first pivot axis between a retracted position and an expanded position of the second frame member, the first actuating assembly comprising:
an actuator providing an actuating force;
a first link having a first end pivotally connected to the first frame member and a second end opposite to the first end;
a second link having a first end pivotally connected to the second frame member and a second end opposite to the first end; and
a third link having a first end attached to the actuator and a second end opposite to the first end,
wherein two of the first link, the second link, and the third link are pivotally connected to each other at their second ends by a connecting pin defining a second pivot axis,
wherein the third link comprises an elongated slot formed therein, the connecting pin being movably received in the slot,
wherein the second link comprises a stop configured to block translatory motion of the first link and the second link, in the slot relative to the connecting pin thereby preventing the connecting pin from moving in a longitudinal direction of the slot, while the second frame member is arranged between the retracted position and the expanded position;
wherein the first actuating assembly is configured to allow the connecting pin to move in the longitudinal direction of the slot, when the second frame member is arranged in the expanded position.

2. The implement according to claim 1, wherein the second end of the first link and the second end of the second link are pivotally connected to each other by means of the connecting pin, and the elongated slot is formed in the third link.

3. The implement according to claim 1, wherein in the retracted position, the second frame member is folded over the first frame member to decrease a width of the implement in a lateral direction of the implement, and the first actuating assembly is configured to lock the second frame member relative to the first frame member.

4. The implement according to claim 1, wherein in the expanded position, the second frame member is arranged next to the first frame member in a lateral direction of the implement thereby enabling operation of the at least one implement tool, and the first actuating assembly is configured to allow vertical movement of the second frame member relative to the first frame member.

5. The implement according to claim 1, wherein the first actuating assembly is configured to be in positive control of the second frame member while moving the second frame member between the retracted position and the expanded position and vice versa.

6. The implement according to claim 1, wherein the stop is a shoulder formed on the second link, wherein the shoulder defines a first guide surface and the third link comprises a second guide surface configured relative to the first guide surface to permit relative rotation when the guide surfaces are in contact with one another,
wherein the first and second guide surfaces are formed to allow rotation of the second link relative to the third link and to block translatory motion of the connecting pin relative to the slot in a longitudinal direction of the slot, while the second frame member is moved and arranged between the retracted position and the expanded position, and
wherein the first and second guide surfaces are formed to allow translatory motion of the connecting pin in the longitudinal direction of the slot, when the second frame member is arranged in the expanded position.

7. The implement according to claim 1, wherein the implement further comprises:
a main frame;
a third frame member corresponding to the first frame member;
a fourth frame member corresponding to the second frame member and pivotally connected to the third frame member by a hinge defining a third pivot axis; and
a second actuating assembly corresponding to the first actuating assembly and configured to rotate the fourth frame member relative to the third frame member about the third pivot axis between a retracted position and an expanded position of the fourth frame member,
wherein the first and third frame members are arranged on opposite sides of the main frame in a lateral direction of the implement.

8. The implement according to claim 1, wherein the first and second links are each formed by an elongated member defining a longitudinal direction and comprising a hole at their first and second ends, respectively.

9. The implement according to claim 1, wherein the first and second links are arranged on opposite sides of the third link in an axial direction of the connecting pin.

10. The implement according to claim 1, wherein the elongated slot is a through hole and the connecting pin extends through the first link, the second link, and the third link as well as through the slot formed in one of the links.

11. The implement according to claim 1, wherein the actuator is a double acting hydraulic or pneumatic cylinder, wherein a piston rod of the cylinder is connected to the first end of the third link.

12. The implement according to claim 1, wherein the implement is a tedder and the at least one implement tool is a tedder rotor.

13. A combination comprising:
an agricultural vehicle; and
an implement according to claim 1, the implement towed by the vehicle.

* * * * *